A. CARTER.
FREEZER.
APPLICATION FILED JUNE 4, 1907.

933,230.

Patented Sept. 7, 1909.

WITNESSES:
F. C. Fliedner
A. O. Lenhart

INVENTOR
A. Carter
BY
Carlos P. Griffin
ATTORNEY

UNITED STATES PATENT OFFICE.

ALBERT CARTER, OF LOS ANGELES, CALIFORNIA, ASSIGNOR TO STOREHEAT MANUFACTURING COMPANY, OF PHOENIX, ARIZONA TERRITORY, A CORPORATION OF ARIZONA TERRITORY, (INCORPORATED IN 1907.)

FREEZER.

933,230.  Specification of Letters Patent.  Patented Sept. 7, 1909.

Application filed June 4, 1907. Serial No. 377,262.

*To all whom it may concern:*

Be it known that I, ALBERT CARTER, a citizen of the United States, and a resident of the city and county of Los Angeles, State of California, have invented certain new and useful Improvements in Freezers, of which the following is a specification in such full and clear terms as will enable those skilled in the art to construct and use the same.

This invention relates to ice cream freezers in which no ice is used to cause the cream to become solidly frozen.

A further object of this invention is to make a freezer which will be easily cleaned when empty and which will quickly freeze the mass of cream with the least expenditure of energy.

A further object of the invention is to make a freezer which will turn as a whole instead of having the cream receptacle alone turn as is the case with many freezers, and since there is no ice to rub on the side of the cream can there is very little frictional resistance to the turning of the machine.

Other objects of the invention will appear as the description proceeds.

Figure 1:
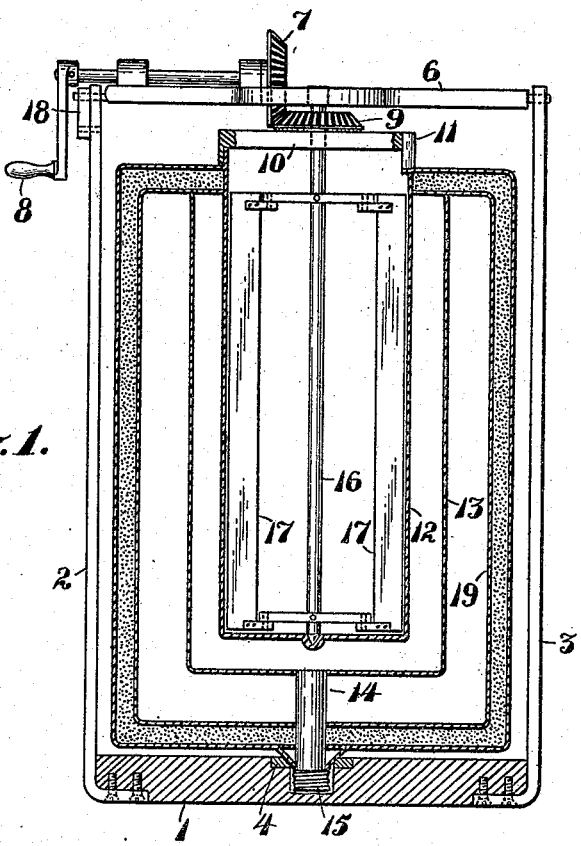
Figure 2:
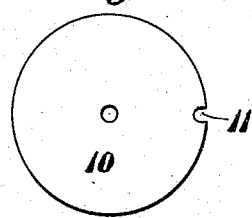
Figure 3:
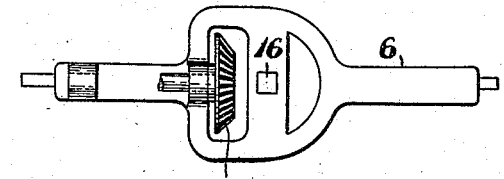
Figure 4:
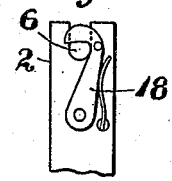

In the drawings, in which like numerals of reference refer to like parts throughout, Figure 1 is a vertical section of the freezer, Fig. 2 is a plan of the top of the can showing the groove which takes a lug on the top to drive the freezer, Fig. 3 is a plan of the cross bar carrying the gear wheel, and Fig. 4 is a view showing a means for holding the cross bar down in one of the uprights.

The freezer is built on the circular base board 1, to which are secured by means of screws the uprights 2, 3, said uprights having their lower ends bent as shown in Fig. 1, to secure them to the base 1. The upright 3 has a hole in its top in which one end of the cross bar 6 is placed, the other upright having a slot cut in its top to hold that end of the cross bar, a common catch 18 being used to hold the bar 6 down when the freezer is being turned.

The common bevel wheel 7 is rotated by means of the crank 8, and it meshes with the bevel wheel 9 carried by the top 10 of the can 12 for the cream, a groove 11 being provided in said can for the purpose of driving the freezer, since the entire freezer is turned, the scrapers 17 which are attached to the rod 16 remaining stationary, a square hole in the top of the cross bar holding the scrapers in a given position.

Outside of the can 12 is placed another can 13, and outside of this can is placed a third can 19 over which is placed a layer of felt or other good non-conductor. The cream is placed in the interior compartment, while a freezing mixture is placed in the compartment next to it, the third compartment having its air exhausted as nearly as practicable.

The freezing mixture is placed in the refrigerant compartment through the bottom of the freezer, a tube 14 extending to the bottom for that purpose, said tube being provided with a cap 15. This cap 15 is rather smaller than the hole in the base 1 on which the freezer turns, and a ring 4 is let into said base to form a bearing for the freezer, said ring being also larger than the cap 15 there is no danger of turning the cap off when running the freezer.

An advantage of having the opening for placing the refrigerant in its receptacle at the bottom is that there is no danger of spilling the same over the mouth of the cream receptacle when the refrigerant is being placed in the freezer, the cream receptacle being secured in the freezer so there is no danger of getting any of the materials used as a refrigerant in said cream receptacle at any time.

The operation of the freezer is as follows: A charge of the freezing mixture is placed in the refrigerant compartment, the cap is screwed into place and the cream is placed in the can 12, the cover 10 is then placed on the machine and the freezer is turned till the cream is frozen. The arrangement of freezing mixture, vacuum, and packing is such that the cream will keep solid in this freezer for hours on the hottest days.

Having thus described my invention in such full and clear terms as will enable those skilled in the art to construct and use the same, what I claim as new and desire to secure by Letters Patent of the United States is as follows, modifications within the scope of the appended claims being reserved.

1. In an ice cream freezer, a base, a pair of uprights carried thereby, a cross bar carrying a driving gear carried by the uprights, a bearing near the center of the base, a revoluble insulated receptacle supported in said bearing, a vacuum compartment, a refrigerant compartment having a pipe leading out the bottom of said insulated receptacle, a cap covering said pipe and being located in the bearing in the base plate, a cream receptacle fixed in the refrigerant compartment and opening on the end away from the opening into the refrigerant compartment, a fixed scraper in the cream receptacle, and means to rotate the insulated receptacle and cream receptacle, substantially as described.

2. In an ice cream freezer, a base plate having a bearing ring at its center, a pair of uprights secured to said base, a cross bar secured to said uprights, a gear supported by said cross bar, an insulated receptacle revoluble in said bearing ring, a vacuum compartment in said insulated receptacle, a refrigerant compartment within said vacuum compartment, a pipe leading from said refrigerant compartment through the vacuum compartment and insulation, a cap on the end of said pipe and within the bearing ring, a cream receptacle within the refrigerant receptacle, a fixed scraper, and a cover having means adapted to coöperate with the driving gear on the cross bar 30 whereby the freezer may be rotated.

In testimony whereof I have hereunto set my hand in the presence of the two subscribing witnesses this 24 day of May A. D. 1907, at Los Angeles, Cal.

ALBERT CARTER.

Witnesses:
C. HUEHNER,
J. M. DUNSMOOR.